United States Patent [19]

Gilbert

[11] Patent Number: 4,699,838
[45] Date of Patent: Oct. 13, 1987

[54] REINFORCED METALLIC AND POLYMER TAPE

[75] Inventor: Ronald E. Gilbert, Katy, Tex.

[73] Assignee: Reef Industries, Inc., Houston, Tex.

[21] Appl. No.: 841,443

[22] Filed: Mar. 18, 1986

Related U.S. Application Data

[63] Continuation-in-part of Ser. No. 804,309, Dec. 3, 1985.

[51] Int. Cl.⁴ .................. B32B 3/16; B32B 15/08; C09J 7/02
[52] U.S. Cl. ..................... 428/201; 116/211; 405/157; 428/209; 428/295; 428/296; 428/352; 428/354; 428/914
[58] Field of Search .......... 428/457, 476.3, 458, 428/461, 209, 201, 343, 352, 354, 914; 405/157; 116/211, 67 R; 350/96.23; 427/207.1

[56] References Cited

U.S. PATENT DOCUMENTS

| | | | |
|---|---|---|---|
| 3,115,861 | 12/1963 | Allen | 116/211 |
| 3,282,057 | 11/1966 | Prosser | 405/157 |
| 3,504,503 | 4/1970 | Allen | 405/157 |
| 3,581,703 | 6/1971 | Hosack | 116/67 R |
| 3,633,533 | 1/1972 | Allen et al. | 116/211 |
| 3,908,582 | 9/1975 | Evett | 116/211 |
| 3,978,274 | 8/1976 | Blum | 428/476.3 |
| 4,076,382 | 2/1978 | Oestreich | 350/96.23 |
| 4,284,457 | 8/1981 | Stonier | 427/207.1 X |

*Primary Examiner*—Thomas J. Herbert
*Attorney, Agent, or Firm*—Margaret A. Boulware

[57] ABSTRACT

A reinforced metallic and polymer tape which has a light reflecting metallic layer and can have a color coating. The reinforcing material is usually a nonwoven clear resin through which the color is clearly visible. The combination of the metallic layer and reinforcing layer produces a high tensile strength, tear resistant tape. The combination also produces a tape that does not have the tendency to curl.

9 Claims, 3 Drawing Figures

REINFORCED METALLIC AND POLYMER TAPE

This application is a continuation-in-part of Ser. No. 804,309 entitled "Sealed Edge Detectable Tape" filed Dec. 3, 1985.

BACKGROUND AND SUMMARY OF THE INVENTION

The use of metallic tapes has become useful in the detection of underground plastic pipe and utility lines. Also, ceramic and other nonmetallic materials such as concrete are used in underground service. The precise location of nonmetallic lines cannot be determined by metal detectors so that a simple method was devised to lay a metallic foil and polymer tape over the line which could be detected in the usual manner. Plastic tapes also have become quite useful in marking areas above ground. The tapes are strung around hazardous areas, police investigation lines and can generally serve as demarcation for any purpose. The tapes used for above ground marking are not reinforced and can be easily torn.

This invention is a reinforced metallic tape that has superior tensile strength that has benefits for use in detection of underground utility as well as above ground demarcation tapes. The high tensile strength is particularly beneficial in the layout operation for underground line marking. The metallic layer also has reflective qualities for use as an above ground marking tape. The tape can have pressure sensitive adhesive so that it can be applied to posts and barriers for marking purposes. The reinforced tapes can be colored and prepared with or without a printed message.

U.S. Pat. No. 3,633,533 discloses a method to locate underground service lines using a metal film coated with a colored plastic. The tape ia not reinforced and has certain drawbacks remedied by the present invention. When a trench is dug for a utility line and a detectable tape is used, typically, the line is laid first. Then there is a partial backfilling of the trench and the tape is laid over the line coming off a roll on a tractor. Then in a continuous process the trench backfilling is completed. As the tape is laid there may be some tension placed on it, as the backfill process is completed, stretching the tape. During this process if too much tension is placed on the tape, it can break causing the operation to be halted until the tape can be mended. Also, the foil layer is not elastic and tension on the tape may cause the metallic foil to break while the plastic coatings are stretched. In some cases a continuous length of metallic conductive material is desirable. Also, the present plastic coated types have a tendency to curl on the edges and care must be taken when laying the tape that it does not become twisted or folded. Although the plastic coated metallic foil tapes have provided a cost efficient method to detect underground piping systems, there are some aspects which can be improved upon.

The present invention is an improved detectable tape which is reinforced. The reinforcing material imparts tensile strength to the tape such that the tape and the foil layer are protected from tearing during the trench backfilling process and the use above ground for marking purposes. For underground usage the metallic foil layer is covered with a thermoplastic layer on the side which is not laminated to the reinforcing material. The metallic layer should be protected from environmental degradation and oxidation. This embodiment may also be used above ground.

Another property is that the reinforced tape does not have a tendency to curl at the edges or twist. The tape lies flat as it comes off a roll. These properties are beneficial from the installation viewpoint, because as the reinforced tape comes off the roll into the trench, there is less likelihood to tear because of the high tensile strength and the tendency of the tape not to curl will make it easier to lay the tape out in the trench.

The reinforced tape can be printed with cautionary messages. Also, a color coating resin can laminate the foil layer and the reinforcing material. This gives a foil or metallic layer on one side and a colored layer on the other. With a nonwoven essentially clear resin reinforcing layer the color coating is clearly visible through the reinforcing layer. Certain color codes have been preselected for use with certain utility installations which can be used in this invention.

The present invention is illustrated by the embodiments in the accompanying drawings.

DETAILED DESCRIPTION OF THE PREFERRED EMBODIMENTS

Figures 1, 2, 3:
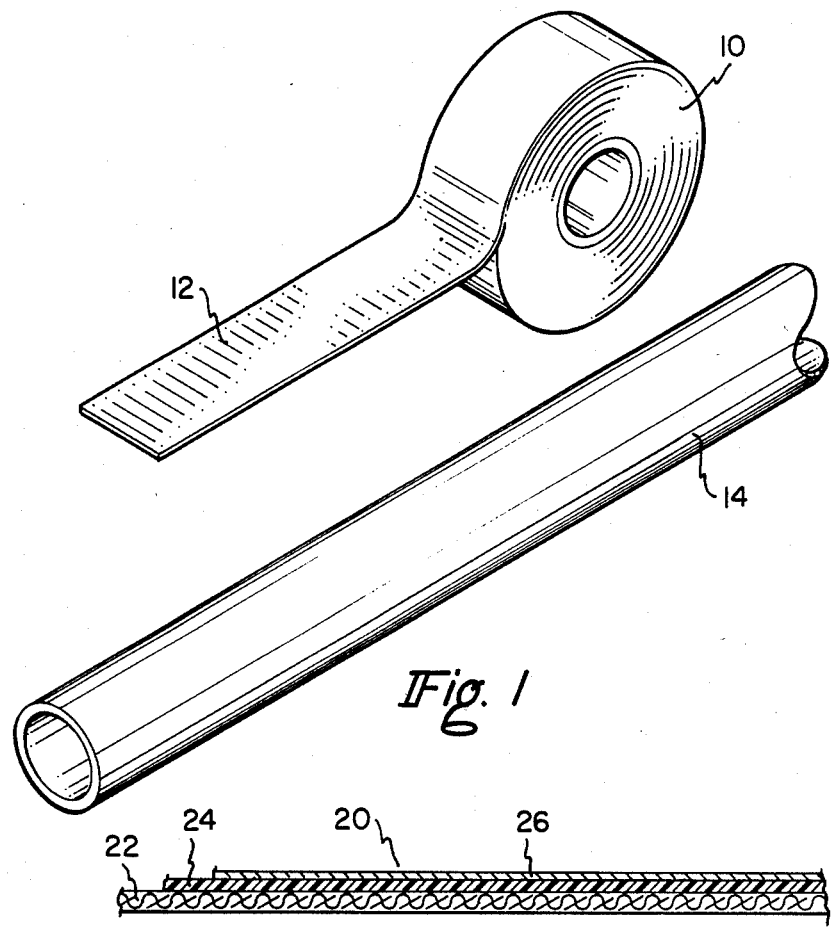
FIG. 1 is a view of the reinforced tape as placed in service over a non-metallic pipe.
FIG. 2 is a cross-section view of the reinforced metallic tape.
FIG. 3 is a cross-section of another embodiment of the reinforced metallic tape.

FIG. 1 is a view of a roll 10 of reinforced tape 12 being laid over a pipe 14. The tape is most useful when the pipe 14 is a nonmetallic construction such as ceramic or plastic. The tape can be laid over telephone cables and buried electrical lines in addition to the piping system shown in FIG. 1. Any type of underground service which needs to be located to be protected from digging equipment operating in the vicinity or located for repairs can be covered with the detectable tape.

The tape can be laid directly on the pipe, cable or other underground construction. More typically, the pipe, cable or underground construction is laid first in the prepared trench. The trench is then partially backfilled and the detectable tape 12 is laid with the underground system approximately directly below the tape 12. The roll 10 is placed on a tractor or other piece of equipment used in the field. The backfilling and tape laying is often an almost simultaneous process and backfill dirt can place stress or tension on the tape during the procedure.

The tape generally carries a printed message of caution that a pipe or cable is buried as shown in FIG. 1. The printed message can include the type of service or any other cautionary message desired. Also, the tapes are color coded according to the service lying under the tape with a particular color generally associated with water, gas, electrical and buried phone lines. The color generally contrasts to the soil so that the tape is visible when digging operations occur to locate the line.

FIG. 2 shows one embodiment of a reinforced tape 20 with a nonwoven fabric reinforcement layer 22 which is laminated with a color coating layer 24. The foil layer 24 can be any desired thickness depending on the service of the product with typical range of between about 0.1 and about 3 mils. The foils can be any ductile metal alloys such as aluminum, copper, steel, silver and iron.

The foil typically used commercially is aluminum because of the cost and ease of handling.

The foil is laminated with a colored coating layer 24 over which the layer 22 of reinforcement fabric is placed. The colored coating can be any types of color impregnated film. The typical color coating is a coating grade low density polyethylene with a stable pigment. The coating can be other thermoplastic polymers or blends which will carry a pigment. The color pigment chosen relates to the color code corresponding to the buried service line or any other color desired for above ground usage.

The reinforcing nonwoven material can be any type of flexible material which will provide the tensile strength desired for the tape. The reinforcement layer can be chosen from the high performance engineering polymers which have the desired strength characteristics. These polymers can include polypropylene, nylon and polyester. The reinforcing material can also include polyimide and carbon fibers. If the reinforcing material is laid over the color coating, it should be substantially transparent so that the color layer 24 underneath will be visible.

The reinforcing layer 26 shown in FIG. 2 is a nonwoven fabric of high density polyethylene which imparts a texture of the fabric to the finished product. A reinforcement fabric which was used in the preferred embodiment is Conwed product No. CC1001 which is a high density polyethylene nonwoven fabric. The Conwed products come in various weights and can be chosen depending on the strength desired. Other reinforcing materials with similar characteristics can be used also. With Conwed No. CC1001 the color coating underneath clearly shows through in the finished product. During the lamination process the color coating migrates through the interstices of the fabric and since the fabric is essentially clear the color shows through the layer of the fabric as well. After the foil 26, color coating 24 and reinforcing material 22 are laminated together, the tape can be printed with a cautionary message on either side of the laminate.

If for any reason a color coding for the tape is not desired, the color stable pigment can be omitted from the laminating resin to give a plain metallic tape. The color coating is generally applied to one side of the tape however, if desired, color coating could be applied to one or both sides of the tape. Also, printing a cautionary or informative message is optional depending on the use. It is apparent that to practice the invention many variations of color, printing and reinforcement are available depending on the needs of the user.

EXAMPLE 1

A sealed edge detectable tape of the construction shown in FIG. 2 was prepared from aluminum foil 0.35 mils, coating resin Gulf P E 1017 with 5% blue color concentrate extrusion coating grade low density polyethylene laminated with Conwed CC1001 high density polyethylene nonwoven fabric. The finished tape was 6 inches wide. The finished tape laid very flat without a tendency to curl. The following physical properties were shown as compared to TerraTape ® Detectable by Reef Industries, Inc. which is a tape now used for underground detection of non-metallic lines.

TABLE 1

| Property | Example 1 | TerraTape ® |
|---|---|---|
| Thickness | 14 ± 2.5 mils | 5.0 ± 0.5 mils |

TABLE 1-continued

| Property | Example 1 | TerraTape ® |
|---|---|---|
| Tensile Strength ASTM-D-882 | | |
| 1" Tensile machine direction | 40 lbs. (min.) | 23 ± 2 lbs. |
| transverse direction | 48 lbs. (min.) | 26 ± 3 lbs. |
| 1" Elongation machine direction | 40% (min.) | 85% ± 10% |
| transverse direction | 60% (min.) | 65% ± 10% |
| Standard Weight | 58 ± 5 lbs/msf | 28 ± 2 lbs/msf |
| Boil Delamination | less than 10% delam. | less than 10% delam. |
| Tongue Tear ASTM - D-2261 | | |
| machine direction | 19 lbs. (min.) | 12 oz. avg. |
| transverse direction | 12 lbs. (min.) | 9 oz. avg. |
| Dart Drop ASTM - D-1709 | 462 g nominal | 400 g nominal |

EXAMPLE 2

FIG. 3 is an embodiment of a reinforced tape that has a layer of resin 30 coating on one side of the foil layer 32 as well as the laminating resin 34 and reinforcing layer 36 on the other side. The resin layer 30 is to protect the foil layer from corrosion from the environmental elements particularly when used underground. For above ground marking purposes, the foil layer would last longer with a protective resin layer. To preserve the reflective qualities the resin should be clear. For underground service, the resin could carry a color stable pigment. A suitable resin is a low density polyethylene. However, layer 30 can be any thermoplastic polymer or blend which can be used as a coating. The construction of FIG. 3 with a low density polyethylene layer 30 and other corresponding layers of the laminate as described in Example 1 has essentially the same properties shown in Table 1.

For use as an above ground marking and reflective tape, it may be desirable to apply a pressure sensitive adhesive. The tape can be applied to posts, signs or barriers as needed for marking. Applying the adhesive to the side with the reinforcing layer exposes the metallic layer which can be reflective for night warning. Any adhesive with the proper operating temperature range can be used. In the preferred embodiment, a high bond strength solvent less adhesive is coated in a 5 mil thickness to the tape. A release paper is applied to the tape before it is rolled. The release paper protects the adhesive layer and is torn from the tape at the time of use.

What is claimed is:
1. A reinforced tape comprising
   a layer of ductile foil,
   a layer of flexible reinforcing material laminated to one side of said ductile metal foil,
   said reinforcing material is polymeric non-woven fabric, and the opposite side of said ductile metal laminated with a thermoplastic coating.
2. A reinforced tape of claim 1 wherein said ductile metal foil layer is chosen from the group consisting essentially of aluminum, copper, steel, iron, silver and alloys thereof.
3. A reinforced tape of claim 1 wherein a printed message is applied to at least one side of the laminate.
4. A reinforced tape of claim 1 wherein said layer of metal foil is laminated with a layer of color coating between the foil layer and the reinforcing material.
5. A reinforced tape of claim 4 wherein said layer of color coating is a low density polyethylene film impregnated with color stable pigment.
6. A reinforced tape comprising
   a layer of aluminum foil, a layer of substantially transparent reinforcing polyethylene non-woven fabric laminated to one side of said foil, a layer of colored coating resin to laminate said fabric to said foil so that the color is visible through said non-woven fabric, a layer of thermoplastic coating laminated to the foil layer on the opposite side of the reinforcing layer.

7. A reinforced tape of claim 6 wherein printed message is applied to at least one side of the tape.

8. A reinforced tape of claim 6 wherein
a layer of pressure sensitive adhesive is applied to one side of said laminate.

9. A reinforced tape of claim 8 wherein said pressure sensitive adhesive layer is protected by release paper prior to use.

* * * * *

UNITED STATES PATENT AND TRADEMARK OFFICE
CERTIFICATE OF CORRECTION

PATENT NO.   :  4,699,838
DATED        :  October 13, 1987
INVENTOR(S)  :  Gilbert It is certified that error appears in the above-identified patent and that said Letters Patent are hereby corrected as shown below:

Column 2 Line 65 "24" should read --26--.

Colume 3 Line 24 "26" should read --22--.

Signed and Sealed this

Twenty-ninth Day of November, 1988

Attest:

DONALD J. QUIGG

Attesting Officer  Commissioner of Patents and Trademarks